(12) United States Patent
O'Donnell, Jr.

(10) Patent No.: US 6,486,875 B1
(45) Date of Patent: Nov. 26, 2002

(54) WIRELESS COMPUTER PERIPHERAL THAT FUNCTIONS AS A MOUSE AND PEN WITH INK PROCESSOR MEMORY POWER DISPLAY AND SPEAKER ALL IN ONE

(75) Inventor: Francis E. O'Donnell, Jr., St. Louis, MO (US)

(73) Assignee: Compapen Inc., Town & Country, MO (US)

( * ) Notice: Subject to any disclaimer, the term of this patent is extended or adjusted under 35 U.S.C. 154(b) by 982 days.

(21) Appl. No.: 09/071,086

(22) Filed: May 1, 1998

Related U.S. Application Data

(63) Continuation-in-part of application No. 08/636,126, filed on Apr. 22, 1996.

(51) Int. Cl.⁷ .......................... G09G 5/00; G08C 21/00
(52) U.S. Cl. ...................... 345/179; 78/19.01
(58) Field of Search ................. 345/156, 157, 345/158, 163, 164, 169, 179; 178/18.01, 19.01, 20.01, 83, 84; 382/188, 187, 189; 358/473

(56) References Cited

U.S. PATENT DOCUMENTS

| | | | |
|---|---|---|---|
| 3,376,551 A | | 4/1968 | Armbruster ............... 345/156 |
| 5,012,349 A | * | 4/1991 | De Fay ..................... 358/473 |
| 5,159,321 A | | 10/1992 | Masaki et al. ............. 345/179 |
| 5,247,137 A | * | 9/1993 | Epperson ................. 178/19.04 |
| 5,291,213 A | * | 3/1994 | Krauss ....................... 345/179 |
| 5,294,792 A | * | 3/1994 | Lewis et al. ............... 345/163 |
| 5,311,208 A | * | 5/1994 | Burger et al. .............. 345/163 |
| 5,371,516 A | * | 12/1994 | Toyoda et al. ............. 345/163 |
| 5,434,371 A | * | 7/1995 | Brooks ....................... 345/179 |
| 5,434,594 A | * | 7/1995 | Martinelli et al. .......... 345/163 |
| 5,446,559 A | * | 8/1995 | Birk ........................... 358/473 |
| 5,548,092 A | * | 8/1996 | Shriver .................... 178/19.01 |
| 5,581,783 A | * | 12/1996 | Ohashi ...................... 358/473 |
| 5,679,930 A | * | 10/1997 | Katsurahira ................ 345/179 |
| 5,774,602 A | * | 6/1998 | Taguchi et al. ............ 382/188 |

\* cited by examiner

*Primary Examiner*—Steven Saras
*Assistant Examiner*—Paul A. Bell
(74) *Attorney, Agent, or Firm*—Paul M Denk

(57) ABSTRACT

A writing instrument that also functions as a computer peripheral. The writing instrument has the general configuration of a ball-point pen. The pen includes a ball for ink writing that is operatively associated with internal sensors that precisely detect the distance and direction of ball movement and relay that directional and distance data to a microprocessor which records a series of vectors similar to a computer mouse. The pen also includes interchangeable memory cartridge for the storage of the data and a wireless computer connect, for example infrared, that can communicate generated or stored data to an associated computer. The pen also includes an external LED data display, a speaker/microphone and an ink reservoir.

6 Claims, 2 Drawing Sheets

WIRELESS COMPUTER PERIPHERAL THAT FUNCTIONS AS A MOUSE AND PEN WITH INK PROCESSOR MEMORY POWER DISPLAY AND SPEAKER ALL IN ONE

CROSS-REFERENCE TO RELATED APPLICATIONS

This application is a continuation-in-part of U.S. patent application Ser. No. 08/636,126, filed Apr. 22, 1996.

STATEMENT REGARDING FEDERALLY SPONSORED RESEARCH OR DEVELOPMENT

Not Applicable.

BACKGROUND OF THE INVENTION

This invention relates generally to computer equipment and, more particularly, to a peripheral device that functions as a hand-held writing instrument and as a computer peripheral.

Word processing by keystroke entry is a relatively slow process. It is particularly cumbersome when the writer is composing as he or she types the material. Often, the writer cannot process the information through the keyboard as rapidly as he or she thinks. This often causes consternation. Voice recognition technology has improved but remains relatively slow as well.

By contrast, handwriting often is the fastest and most convenient way to prepare documents. Of course, conventional pen on paper handwriting has significant drawbacks. However, there is computer software available that convert handwriting to typeface and further support writing by hand in the production of documents. Nevertheless, limitations imposed by the hardware required for such pen-based computer applications have restricted the use and growth of pen-based computing to date. Pen-based computing heretofore has consisted of grid-type computers with stylus-type writing instruments. One such stylus, for example, is sold by A. T. Cross under the trademark "i Pen". Such systems use a stylus applied to a special screen having a means for data input. These types of systems are inconvenient, however, because they necessitate access to the special screen. That is, the writing instrument is limited to its application within the system and cannot be used independently of the special screen.

In 1964, Armbruster (U.S. Pat. No. 3,376,551) described a magnetic writing device wherein an ink pen mechanism included a rotating ball for the electromagnetic detection and quantification of movement by induction of an electric current. Thus, distance was not directly measured. The speed of ball rotation determined the amount of electric current induced which was proportional to the velocity. The output was variably to an electric typewriter or to a computer. After the introduction of the computer mouse in the 1980's, Masaki (U.S. Pat. No. 5,159,321) in 1992 taught the use of an ink pen mechanism including a rotating ball that would function as a mouse-like device for computer input. Unlike Armbruster, Masaki taught a spring-type of sensor mechanism for detection and quantification of movement of the rotating ball point wherein ink on the ball surface would cause displacement of two spring-loaded sensing devices at right angles yielding velocity data.

Generally speaking, the ability to provide a mouse-type function including writing, printing, and drawing requires determination of vectors consisting of direction and length (distance). Alternatively, length can be derived from velocity determination over a known time interval assuming an accurate integration of acceleration data.

The present invention overcomes the limitations of the prior art by separating the ink writing mechanism from the sensing mechanism. In Armbruster's device, the ink coats the ball and confounds the accurate detection of changes in magnetic flux which were used to determine velocity and direction. Even skin oil has been well recognized as a source of computer mouse malfunction. In Masaki, the ink on the rotatable ball can foul the displacement of the spring-loaded sensor which was used to determine velocity and direction. The present invention dissociates the two functions in a way which still allows for simultaneous use as an ink writing instrument and a mouse-like device for computer input. Furthermore, it directly measures distance (as opposed to velocity determination of prior art) and direction of pen motion. Moreover, unlike prior art, the present invention incorporates features that allow it to record data independent of a computer.

SUMMARY OF THE INVENTION

It is among the principal objects of the present invention to provide a writing instrument that also functions as an improved computer peripheral.

Another object of the present invention is to provide a computer peripheral capable of accurately determining distance and direction of pen displacement.

Another object of the invention is to provide such a writing instrument that can be used independently of the associated computer.

Another object of the invention is to provide such a writing instrument that retains its function as a writing instrument along with its functions as a computer peripheral.

Yet another object of the invention is to provide such a writing instrument that does not require a special writing pad or grid.

Still another object of the invention is to provide such a writing instrument that provides simultaneous retention of data created through the use of the writing instrument.

Another object of the invention is to provide such a writing instrument that can collect and store data from the instrument as the data is being collected.

Yet another object of the invention is to provide such a writing instrument that can transfer the retained data to the associated computer.

Another object of the invention is to provide such a writing instrument that can transmit data to and from an extraneous source and transmit that data in audio form through a speaker element contained in the instrument.

Still another object of the invention is to provide such a writing instrument that can has interchangeable memory chips or cartridges.

In accordance with the invention, generally stated, a writing instrument that also functions as a computer peripheral is provided. The writing instrument is configured like a ball point pen. The ball element or rolling point is associated with an ink source and can function like a conventional writing instrument. Further, the rolling point functions as a miniaturized mouse. The pen includes a positional orientation system whereby the pen is orientated when in use to eliminate rotational errors. The pen includes wireless computer connection, for example, infrared connection to directly communicate with and transfer data to an associated computer. Further, the pen includes a interchangeable memory chip so that data produced by the pen can be stored for later retrieval. The pen also includes a microprocessor chip to integrate the various functions and a battery power source. The pen also may include a miniature speaker and microphone so that audio data can be transmitted to and from the user.

The several features of the present invention include the ability to function as a wireless computer mouse. Further the pen of the present invention allows for the convenient preparation of traditional written communications or record on paper with the ability also to store the data in the pen as created and later download to the computer. Memory chips may be encrypted with security codes, date and time clocks, and so forth for document authentication and security. Likewise, the pen can incorporate lock-out features that prevent use of the pen without the appropriate memory chip. The pen is expandable and can provide limitless memory by the use of interchangeable memory chips or memory cartridges. The speaker allows the user to receive data, for example instructions or text questions. A microphone in the speak allows the user to respond back to the computer or another person with voice commands.

DESCRIPTION OF THE PREFERRED EMBODIMENT

Figure 1:
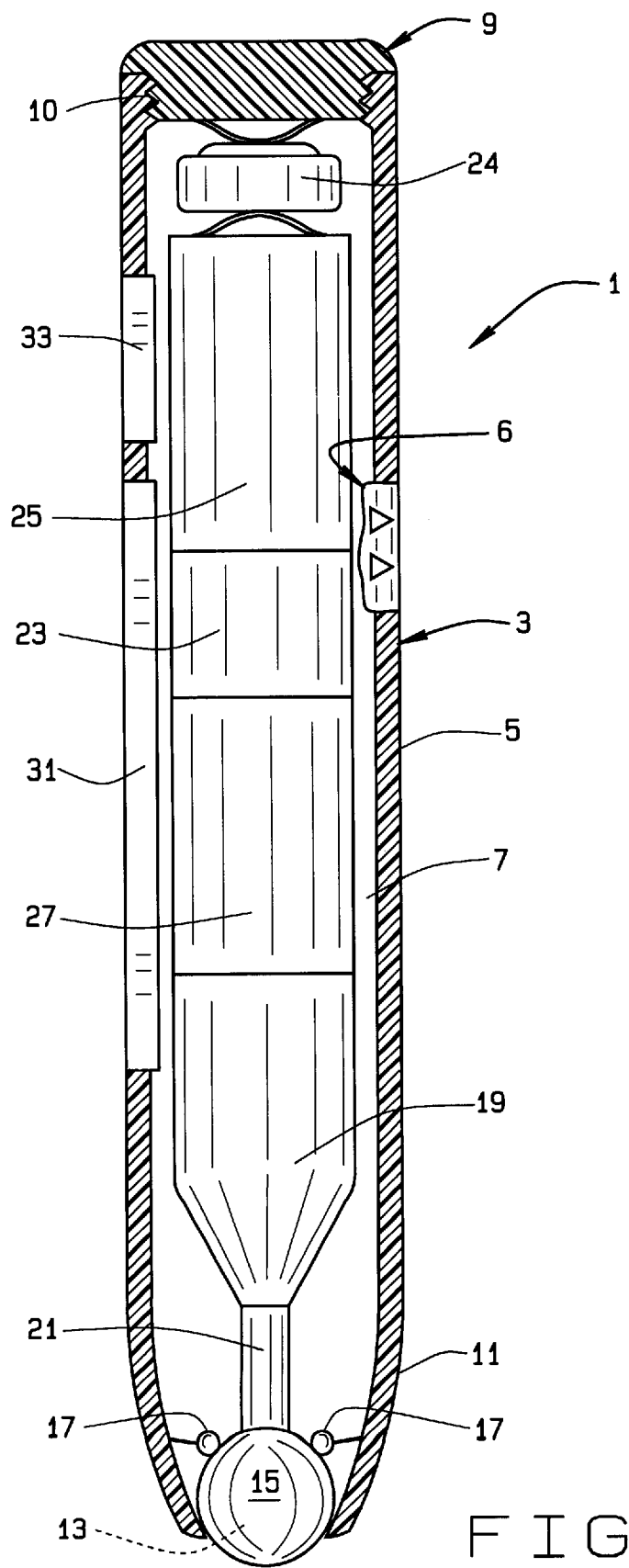
FIG. 1 is a part cross-section, part diagrammatic illustration of the writing instrument computer peripheral of the present invention.
Figure 2:
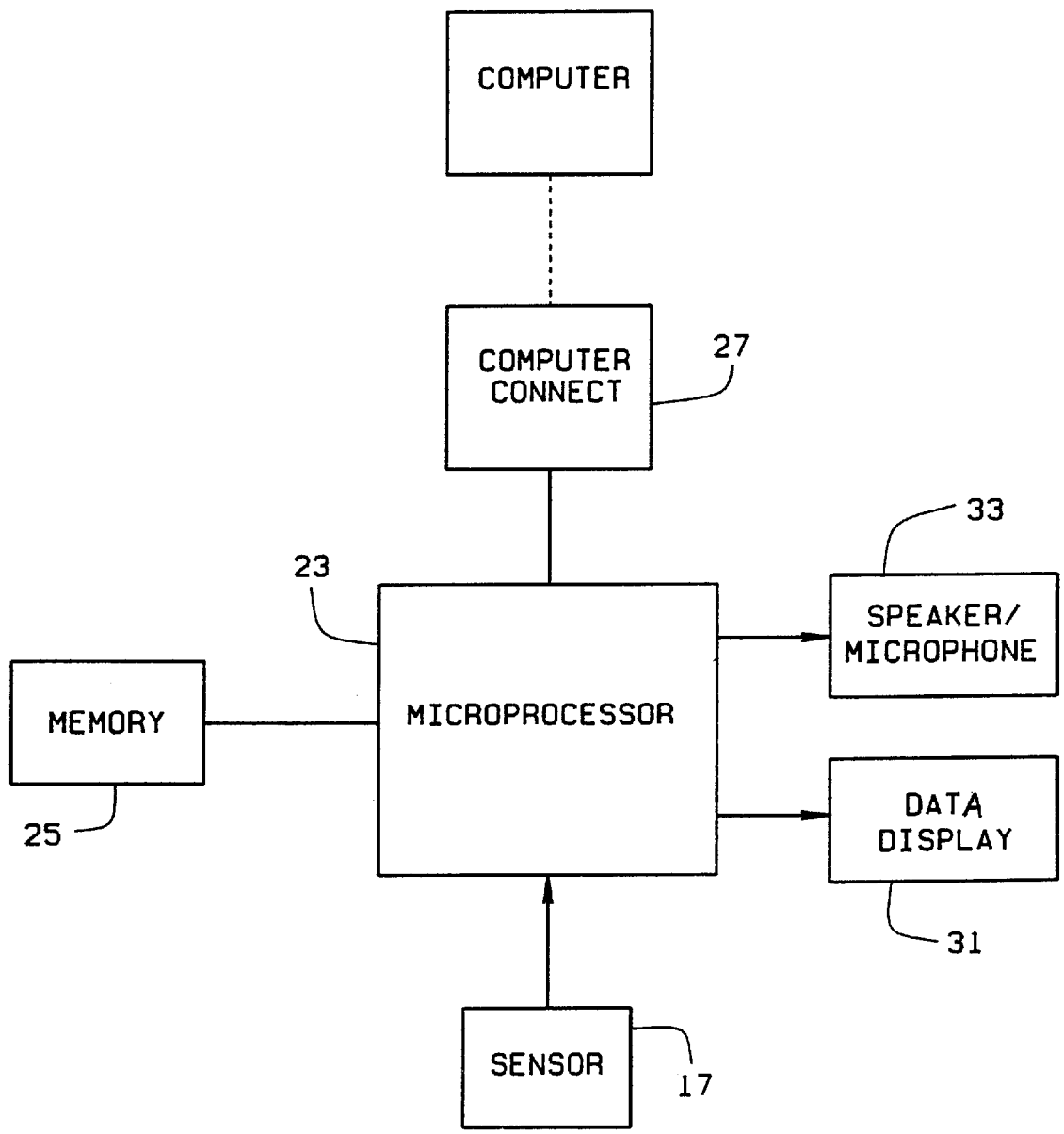
FIG. 2 is a diagrammatic drawing of the writing instrument computer peripheral, showing the transmission of data from the writing instrument to an associated computer.

The writing instrument computer peripheral of the present invention is indicated generally by numeral 1 in FIG. 1. It will be appreciated that the preferred embodiment of writing instrument 1 is configured, at least externally, like a conventional ball-point pen. Therefore, for ease of description, the writing instrument will be referred to hereinafter as pen 1.

Pen 1 has an elongated body 3 comprised of a hollow tube 5. Tube 5 includes, on the external surface, particular markings, shown in the illustrated embodiment as arrows 6 for maintaining appropriate orientation of the pen while in use. Tube 5 defines an elongated internal bore 7. It will be appreciated that the overall dimension of body 3 is such to give the appearance, at least externally, of a conventional ball-point pen. Body 3 has an upper end 9 with a removable cap 10 threadedly engaged in bore 7 and a lower end 11. Lower end 11 includes a generally circular opening 13 that communicates with bore 7.

A ball 15 is freely seated at opening 13. At least one contact or sensor 17 is disposed in end 11 at an angle of approximately 90° angles with respect to the body 3. In the preferred embodiment, two sensors 17 are used. The sensors 17 are in contact with the ball 15, and preferably are odometer-like sensors. The sensors 17 are operatively connected to a microprocessor, as will be explained below. Sensors 17 are designed to sense the directional movement (distance) of the ball during handwriting motion.

Ball 15 is attached to an ink reservoir 19 by a hollow tube 21 or the like. Ink reservoir 19 supplies ink to ball 15 so as to allow ball 15 also to function like a ball in a conventional ball-point pen. Other embodiments not including an ink source may be used to generate data without a concurrent manuscript.

Ball 15 is contacted by sensors 17 which function as odometer-type devices thus generating precise information about distance traversed as well as direction. The combination of directional and distance data from sensors 17 in contact with ball 15 generate a series of vectors which allow the recording of a written item such as print, cursive, numeral, illustration, and the like.

Pen 1 also includes a preprogrammed microprocessor 23. Microprocessor 23, as stated above, is operatively connected to sensors 17 so as to receive directional and distance data from the ball 15. The microprocessor 23 is programmed to integrate all of the functions of pen 1. Further, microprocessor 23 is programmed to achieve simultaneous data capture as a document is created with the pen and provide real time or delayed transmission to the associated computer. Particularly, microprocessor 23 is programmed to convert distance and directional data, for example, into digital data so that it can plot linear movement incrementally on X and Y axes so that the excursion of ball 15, for example during writing, is converted into useful data. Also included, adjacent cap 10, is a battery 24 of sufficient power to operate the microprocessor and other elements to be explained below.

There is an interchangeable memory chip or memory cartridge 25 adjacent to the upper end 9. The memory cartridge 25 is positioned adjacent the end so that cap 10 can be removed and the battery removed to allow removal of the interchangeable memory cartridge 25. Memory cartridge 25 is designed to store data as it is created by the pen and processed by the microprocessor 23. The data stored in memory cartridge 25 can be communicated to remote computer via modem or other appropriate means. The memory cartridge can be encrypted with security codes, date and time clocks, and other means for security and document authentication. Further, memory cartridge 25 can be preprogrammed with audio or text messages or instructions for the user. For example, questionnaires, examination questions, checklists or test procedures can be stored and communicated item by item. Pen 1 further contains a lock-out that prevents operation of the pen without proper memory installed.

A wireless computer connector 27 also is included in pen 1. Connector 27 can be any acceptable technology. In the illustrated embodiment, connector 27 is an infrared transmitter designed to transmit data directly from the microprocessor or from the memory cartridge to a free-standing computer, for downloading.

Further, the illustrated embodiment of pen 1 includes an LED display 31 on an external surface of tube 5 to display data, for example the preprogrammed data described above, from the memory cartridge or microprocessor to the user of pen 1. The data can be displayed alphanumerically or in any other appropriate manner.

Pen 1 includes a speaker 33 positioned adjacent the upper end of body so that it is not covered or otherwise blocked by the user's hand. Speaker 33 also can include a microphone to pick up sound. Speaker 33 allows the user to receive audible messages and the microphone allows the user to send audible messages via the wireless computer connection or other conventional transmission means.

It will be apparent to those skilled in the art that various changes and modifications may be made in pen 1 of the present invention without departing from the scope of the appended claims. Therefore, the foregoing description and accompanying drawings are intended to be illustrative only and should not be construed in a limiting sense.

What is claimed is:

1. A hand-held wireless computer peripheral allowing for wireless transmission of data representative of written information to an associated computer, comprising:

a hollow housing;

a rotatable ball disposed at one end of said housing;

an ink reservoir adjacent to and in fluid communication with said ball to allow for written information to be recorded by a user on a document;

sensors disposed within said housing and in communication with said ball for measuring distance and direction of ball rotation as the written information is recorded by the user;

a microprocessor disposed within said housing and electrically connected to said sensors, said microprocessor generating data representative of the written information based upon the measured distance and direction of ball rotation;

a preprogrammed memory storage device electrically connected to said microprocessor; said preprogrammed memory storage device being preprogrammed with data and being capable of storing data generated by said microprocessor;

computer connecting means for transmitting data from said writing instrument to the associated computer;

a power source disposed within said housing, and providing electrical power required for operation of said computer peripheral;

an externally viewable data display mounted on said housing for displaying the preprogrammed data stored in said memory storage device.

2. The computer peripheral as set forth in claim 1 wherein said memory device includes an interchangeable memory unit.

3. The computer peripheral as set forth in claim 1 further including directional markers provided upon the surface of the housing to ensure proper positioning of said computer peripheral with respect to said computer during data transmission from the instrument to the computer.

4. The computer peripheral as set forth in claim 1 further including a speaker that allows a user to receive audible messages.

5. The computer peripheral as set forth in claim 4 further including a microphone allowing the user to record audible messages in said memory storage device, and transmit data representative of audible messages to the computer via the wireless computer connect.

6. The computer peripheral as set forth in claim 1 wherein said computer connecting means includes an infrared transmitter that transmits data to a receiver in the computer.

* * * * *

UNITED STATES PATENT AND TRADEMARK OFFICE
CERTIFICATE OF CORRECTION

PATENT NO. : 6,486,875 B1
DATED : November 26, 2002
INVENTOR(S) : Francis E. O'Donnell, Jr.

It is certified that error appears in the above-identified patent and that said Letters Patent is hereby corrected as shown below:

<u>Title page,</u>
Item [73], Assignee, please amend the name of the Assignee as follows:
-- Compupen, Inc. --.

Signed and Sealed this

Fifteenth Day of April, 2003

JAMES E. ROGAN
*Director of the United States Patent and Trademark Office*